John T. Baker
Kay N. Burns
Roscoe W. Mitchell, Jr.    Inventors

By John D. Gassett    Attorney

John T. Baker
Kay N. Burns
Roscoe W. Mitchell, Jr. Inventors

April 19, 1966    R. W. MITCHELL, JR., ETAL    3,247,481
METHOD AND APPARATUS FOR DISPLAYING SEISMIC SIGNALS
Filed April 22, 1960    4 Sheets-Sheet 3

John T. Baker
Kay N. Burns
Roscoe W. Mitchell, Jr.    Inventors

By *John D. Gassett*    Attorney

April 19, 1966    R. W. MITCHELL, JR., ETAL    3,247,481
METHOD AND APPARATUS FOR DISPLAYING SEISMIC SIGNALS
Filed April 22, 1960    4 Sheets-Sheet 4
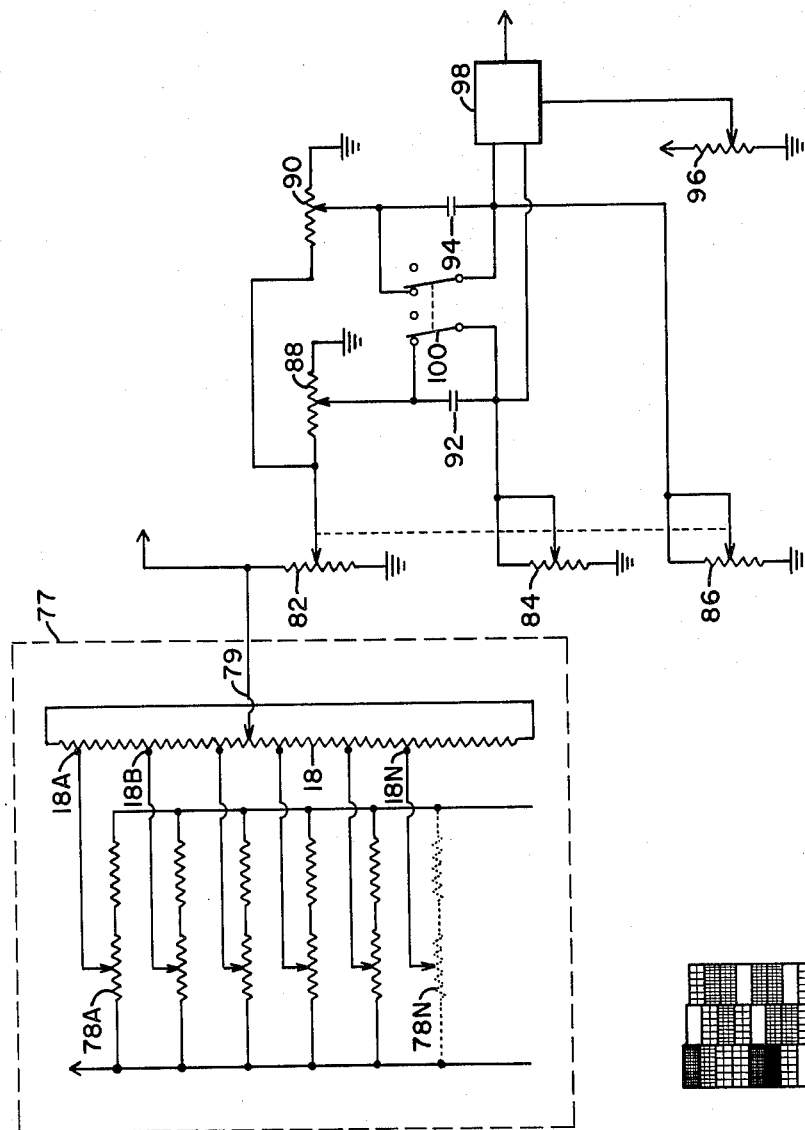
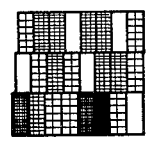
John T. Baker
Kay N. Burns
Roscoe W. Mitchell, Jr.    Inventors
By John D. Gassett    Attorney

United States Patent Office 3,247,481
Patented Apr. 19, 1966

3,247,481
METHOD AND APPARATUS FOR DISPLAYING SEISMIC SIGNALS
Roscoe W. Mitchell, Jr., John T. Baker, and Kay N. Burns, Tulsa, Okla., assignors, by mesne assignments, to Esso Production Research Company, Houston, Tex., a corporation of Delaware
Filed Apr. 22, 1960, Ser. No. 24,061
11 Claims. (Cl. 340—15.5)

This invention is broadly concerned with a system for recording seismic signals. More particularly the invention is concerned with a system for preparing a corrected seismogram from uncorrected field records. The invention is especially concerned with a system for preparing a corrected variable density seismic section from uncorrected field records in which the corrections are entered automatically.

Geophysical prospecting procedures using artificially induced seismic disturbances has found wide application in the search for petroleum and other mineral deposits. It is a general practice to initiate an explosion or other seismic disturbance at a point near the surface of the earth. The resulting seismic waves travel downwardly into the earth from that point until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance points it is possible to detect the arrival of the reflected seismic waves at the surface of the earth. Furthermore, by using accurate timing devices and recording means it is possible to determine not only the magnitude of the signal received by the various geophones, but also to measure the time required for the seismic waves to travel from the disturbance points down to the various discontinuities and thence to the geophones. By knowing this information and by measuring the distances between the various geophones from the seismic disturbance point, and by further measuring or assuming velocities of seismic waves in a particular section of the earth under study, it is possible to calculate and determine the depths of the various discontinuities beneath the surface of the earth.

Recently, seismic recorders of a reproducible type have been developed and these recorders are finding ever increasing application at the present time. Magnetic tape recorders are the most commonly used reproducible type seismic recorders. Reproducible type recorders derive their name from the fact that they receive electrical signals from geophone locations and transform these signals into permanent or semi-permanent traces which are reproducible in character. In general, all reproducible recorders and traces are characterized in that the trace information may be scanned by suitable transducer to generate trains of electrical signals in response to the trace information on a reproducible recording medium.

In ascertaining the depths of subterranean strata or other seismic reflection events, it is desired to make two general classes of corrections in the original seismic data. First, it is necessary to make certain "static" corrections which are static or fixed quantities for each seismic signal detected and recorded by a given geophone and transducer location. Corrections in this category compensates for such things as the height of the geophone relative to an assumed datum plane, the variation in travel time of the seismic waves through a low velocity layer immediately adjacent the earth, the elevation of the disturbance or shock point relative to the datum plane, etc.

A second type of correction that must be made to the seismic records is the so-called "dynamic" or "variable" type in that the magnitude of the correction varies with the time for the signals that are received by any given geophone or transducer location. This category of correction includes the "spread" or "step-out" correction which is a function of the distance of a geophone location from a shot point. It also includes any correction that is occasioned by variation in seismic velocity with depth in the section of earth under study.

Broadly, the present invention concerns methods and apparatus for displaying a plurality of seismic traces simultaneously in variable density form with static and dynamic corrections applied electronically. More particularly in a preferred embodiment, a multiplicity of seismic signals from a previously recorded magnetic medium, for example, are electronically modified as required such as by amplification, filtering, etc. These seismic signals then go to gating circuits where each signal is sampled sequentially at some rate sufficiently higher than the highest seismic signal frequency. The output of all gates are connected to a common line so that the result is a multiplexed signal containing bits of information from all seismic signals in pulse amplitude form. This information is amplified as required and goes to a print control means. When the print control means is energized, the multiplexed signal passes to the grid (or cathode if desired) of a cathode ray tube where it causes the cathode ray beam and hence the light output to be modulated in accordance with the multiplex signal. A linear sawtooth voltage waveform synchronized with the sampling circuit is applied to the horizontal plates of a cathode ray tube to separate the bits of seismic information into discrete variable density traces. That is, as a beam of light is swept across the face of a cathode ray tube, horizontal segments will be modulated in intensity in accordance with the amplitude of the seismic signal with which it is representative. Static and dynamic corrections are preferably achieved by providing an electronic correction generator for each seismic trace. The correction generator outputs are sampled by the correction gates in time sequence and in synchronism with the seismic sampling. The multiplexed correction signal is amplified and applied to the vertical deflection plates of the cathode ray tube. A photographically recording medium is moved in synchronism with the reproducible record in a direction normal to the sweep of the signal across the face of a cathode ray tube. The photographic medium is thus exposed in the form of a corrected variable density seismic section.

The objects and a better understanding of this invention may be had from the following descriptioin taken in conjunction with the drawings in which:

FIG. 5 illustrates an electrical circuit for generating a voltage proportional to spread corrections; and FIG. 6 illustrates a part of a variable density section produced.

Figure 1:
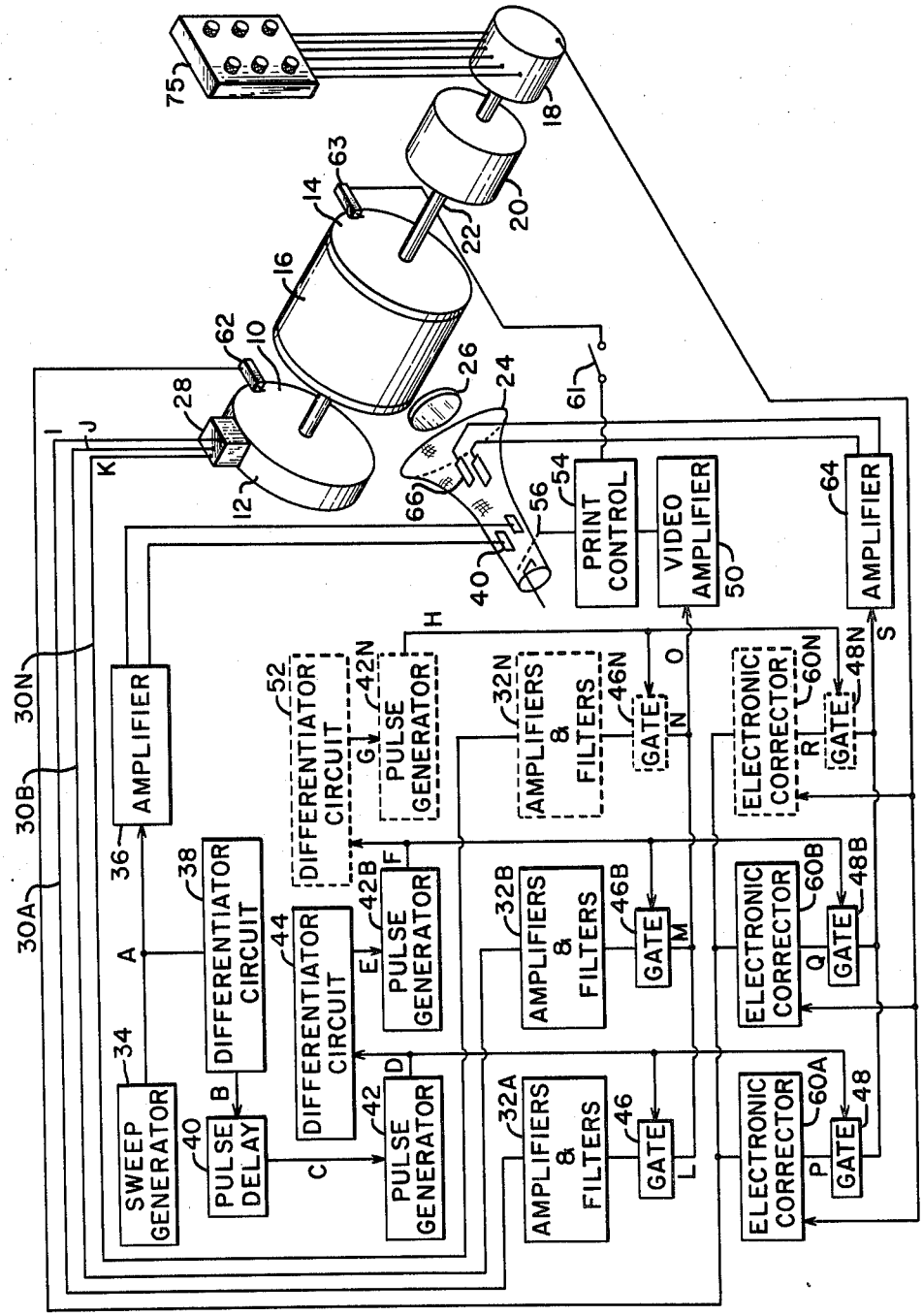
FIG. 1 illustrates in schematic and block diagram form one embodiment of and the best mode contemplated for carrying out this invention.

Referring to the drawing and FIG. 1 in particular there are illustrated thereon a playback drum 10 upon which is mounted a magnetic recording medium 12, a seismic section recording drum 14 upon which is mounted a photographic film 16, a potentiometer means 18 and a motor 20. Playback drum 10, seismic section recording drum 14, potentiometer means 18 and motor 20 are all mounted on shaft 22 which is driven by motor 20.

The term "potentiometer means" and "potentiometer" as used above and hereinafter is defined as a variable resistive device by which a potential difference (or voltage) may be changed.

A cathode ray tube 24 is arranged to have its face substantially parallel to the axis of drum 14. A lens 26 for focusing the light beam from the face of cathode ray tube 24 onto film 16 is provided between cathode ray tube 24 and drum 14. Lens 26 is preferably a compound spherical type.

A multi-head reproducing unit 28 is provided to reproduce the seismic signals from magnetic recording medium 12. The output of multi-head reproducing unit 28 is fed through leads 30A, 30B and 30N. Although only three leads are shown it will be understood that any number may be used as may be required by the seismic section recording being reproduced. Each lead 30A to 30N is connected to its respective amplifier and filter means 32A to 32N. Amplifier and filter 32A may, for example, be means to amplify the signal reproduced and to filter out those frequencies of the signal not desired to be processed. Suitable amplifiers and filters are well known. A sweep generator 34 is provided which is capable of producing a sawtooth waveform more fully described hereinafter. The output of sweep generator 34 is fed to amplifier 36 and differentiator circuit 38. The output of amplifier 36 is fed to the horizontal plates 40 of cathode ray tube 24. In operation, the sawtooth signal thus amplified is used to sweep an electron ray beam across the face of a cathode ray tube.

Figure 2:
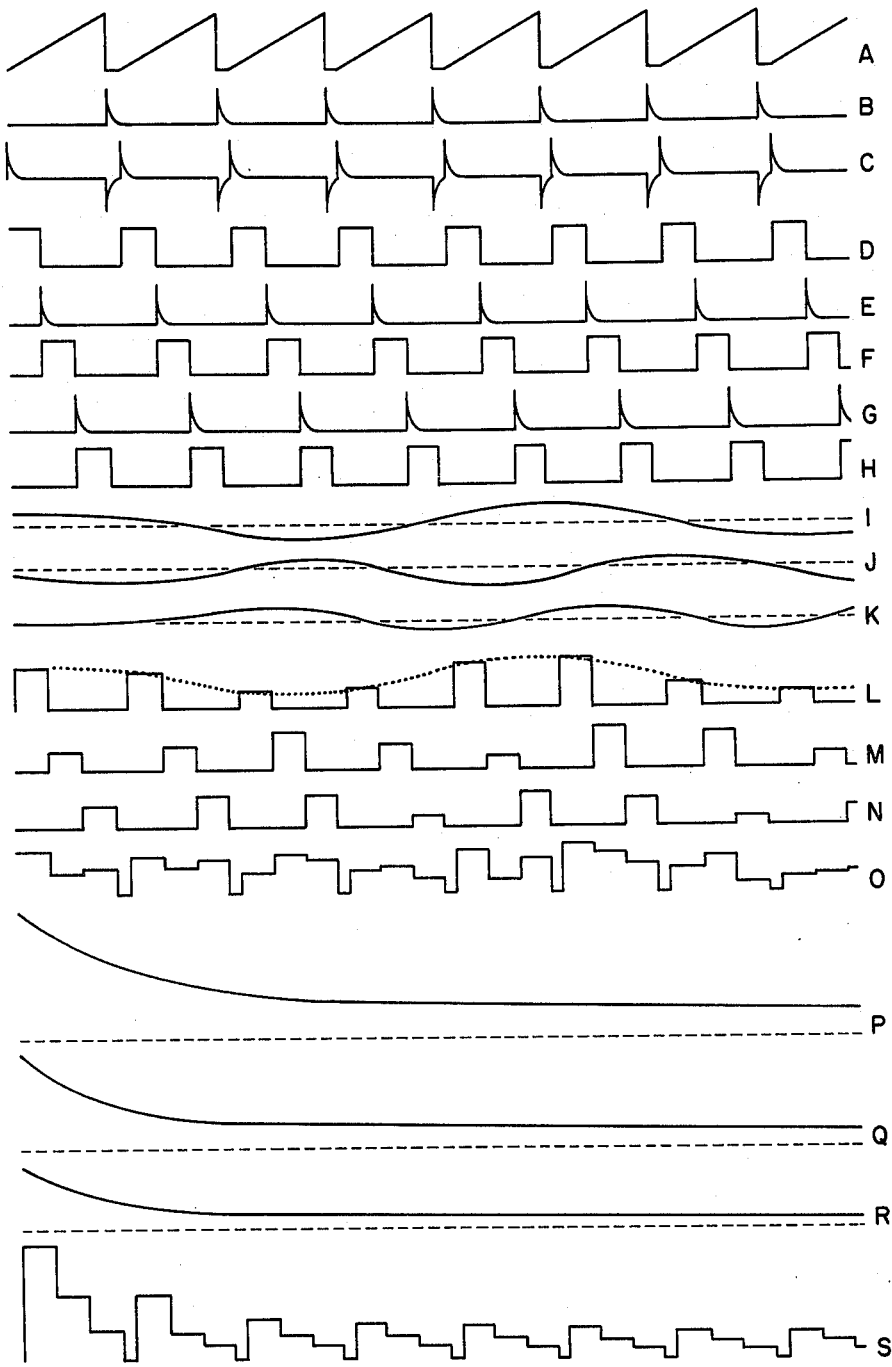
FIG. 2 illustrates electrical signal waveforms at different points in the embodiment shown in FIG. 1.

The output from sweep generator 34 is also fed to differentiator circuit 38. Differentiator circuit 38 is of a character to generate a sharp pulse coinciding in time with the start of the retrace of the sawtooth signal generated by sweep generator 34. The output of differentiator circuit 38 is connected to pulse delay circuit 40. Pulse delay circuit 40 is of a character to delay its input signal in time equal to a preselected retrace interval which will be explained more fully in connection with FIG. 2. The output of pulse delay circuit 40 is fed to pulse generator 42. Pulse generator 42 is of a character to emit a square pulse of short duration with the leading edge of the pulse coinciding in time with the pulse received from pulse delay circuit 40. The duration of the square pulse from the pulse generators 42, 42B and 42N may be controlled to represent the spacing between geophones.

The output from pulse generator 42 is electrically connected to differentiating circuit 44 and to gates 46 and 48. Differentiating circuit 44 is of a character to generate a sharp pulse for the trailing edge of each pulse of the signal fed to it from pulse generator 42. The output of differentiating circuit 44 is electrically connected to pulse generator 42B which is similar to pulse generator 42. The output of pulse generator 42B is electrically connected to differentiating circuit 52 which is similar to and may be identical with the differentiating circuit 44. The output of pulse generator 42B is also electrically connected to gates 46B and 48B. The output of differentiating circuit 52 is electrically connected to pulse generator 42N which is similar to and may be identical with pulse generators 42 and 42B. The output of pulse generator 42N is electrically connected to gate 46N and gate 48N.

The outputs of gates 46, 46B and 46N are electrically connected to a common line leading to video amplifier 50. Amplifier 50 may be any conventional electrical circuit which amplifies the signal fed to it a desired amount. The output of amplifier 50 is fed to print control means 54 which, in its simplest form, can be a relay which is controlled by cam actuated switch 63 and manual control switch 61 to electrically connect the signal from video amplifier 50 to the control grid 56 of cathode ray tube 24. Cam-actuated switch 63 on drum 14 is closed upon drum 14 passing its reference line thus energizing print control means 54. A manual control represented by switch 61 permits the print control to be energized only when desired.

An electronic corrector circuit 60A etc., is provided for each seismic signal reproduced from magnetic recording medium 12. The electronic corrector generates a voltage which is a function of the correction to be applied to each seismic signal being processed. The electronic corrector circuit 60A, 60B and so forth to 60N are energized upon playback drum 10 passing its zero starting point. A cam-actuated switch 62 on drum 10 is conveniently provided for this purpose and is electrically connected to each electronic corrector circuit. A suitable electronic corrector circuit is illustrated in FIG. 5 and will be explained in detail hereinafter. The output of gates 48, 48B and 48N are each electrically connected to amplifier 64. The output of amplifier 64 is electrically connected to the vertical plates 66 of cathode ray tube 24.

Figure 3:
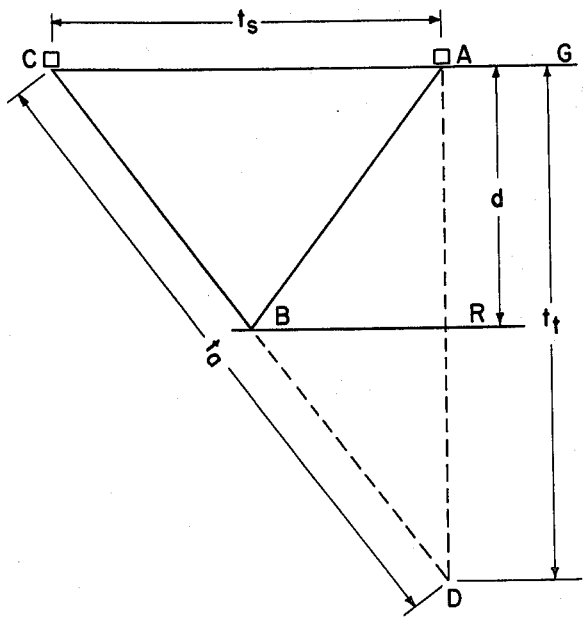
FIG. 3 is a representation of a vertical section of earth along a selected profile showing the geometry involved in making spread corrections.

Referring now to FIG. 3, an explanation of the geometry of seismic spread correction is given. It is assumed that line G represents a selected portion of the surface of the earth with an explosive shot placed near the surface at point A. Seismic energy in traveling from the shot to the geophone at point C as a reflected wave from a subsurface layer represented by line R at a depth $d$ takes a path A–B–C. The time of travel from the instant of detonation of the shot to the time that a reflection from subsurface R reaches point C is proportional to the distance A–B–C; whereas the actual depth of interest is represented by $d$. D is the image of A with respect to line R. If a perpendicular line is drawn from point A to line R and the line A–B is "folded over" on line R, a large triangle A–D–C is obtained in which the distances of interest are more clearly presented. Thus, the distance A–B–C is the same as distance D–B–C, and the distance A–D is twice the distance $d$. In the triangle A–D–C–, A–D which may be represented by $t_t$ is equivalent to the actual travel time of a reflected wave in traveling from point A to the reflecting layer R and back to point A and is the distance a reflected wave would have traveled if the travel path were truly vertical. The distance A–C may be represented by $t_s$ and is representative of the time required for a wave to travel from A to C at the average velocity from A to B. The distance D–C which may be represented by $t_a$ is equivalent to the length of the actual travel time of a reflected wave in traveling from point A to the reflecting layer R and then to the geophone C. In terms of travel time, $t_a$ is the apparent travel time for a seismic pulse to travel from shot point A at the surface to the reflecting bed and back to the surface; or in other words, $t_a$ is the actual travel time for the recorded event. It is desired to correct travel recorded time $t_a$ to equal the vertical time for a seismic pulse to go from shot point A at the surface to the reflector bed and back to the surface, or in other words, $t_t$ is the desired time to be recorded.

An analysis of the normally desired dynamic correction and its approximation follows. The normal correction $x$, is given in Equations 1a and 1b.

(1a) $$x = t_s$$

when $t_a$ is less than $t_s$.

(1b) $$x = t_a - \sqrt{t_a^2 - t_s^2}$$

when $t_a$ is equal to or greater than $t_s$.

The condition of Equation 1b is of particular interest and a brief development of it follows:

(2) $$x = t_a - t_t$$

(3) $$t_t = \sqrt{t_a^2 - t_s^2}$$

A simple substitution of the value of $t_t$ in Equation 3 into Equation 2 gives the Equation 1. By multiplying all the terms in Equation 1 by $1/t_s$ gives Equation 4.

(4) $$\frac{x}{t_s} = \frac{t_a}{t_s} - \sqrt{\left(\frac{t_a}{t_s}\right)^2 - \left(\frac{t_s}{t_s}\right)^2}$$

Let
$$\frac{t_a}{t_s} = r$$

and substituting $r$ into Equation 4 we have Equation 5 which follows:

(5) $$x = t_s[r - \sqrt{r^2 - 1}]$$

It can be shown that Equation 5 can be approximated to a close degree by Equation 6 which follows:

(6) $$x = t_s[\alpha e^{-At_a} + (1-\alpha)e^{-Bt_a}]$$

In Equation 6, $e$ is the base of the natural logarithms. Equation 6 approximates Equation 5 upon the proper selection or choice of the constants $\alpha$, $A$, and $B$. A suitable set of constants which give a very close approximation are:
$$\alpha = 0.865, \ A = 1.0, \text{ and } B = 0.1$$

Figure 4:
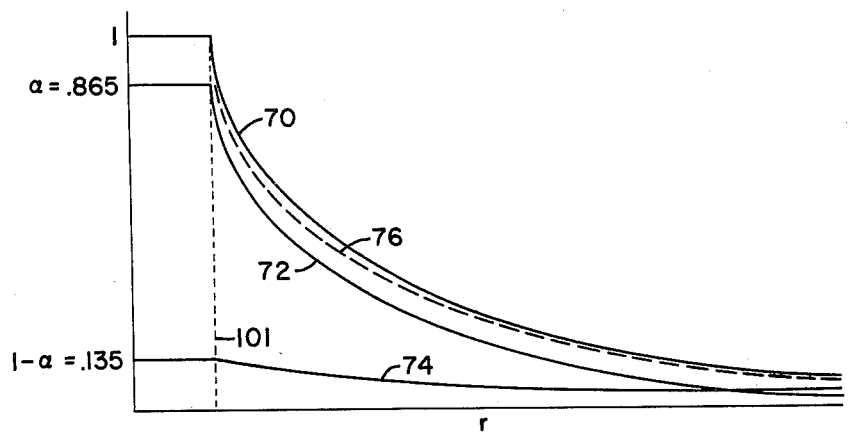
FIG. 4 illustrates a curve representing the required correction voltage and other curves representing other voltages whose summations approximate the correction voltage.

Referring now to FIG. 4 there is illustrated three curves on the graph shown. On the graph shown, the abscissa is labeled $r$ which is normalized or rationalized time, and the coordinate is the magnitude of the desired correction normalized or rationalized with respect to $t_s$. Illustrated thereon is curve 70 which is the true correction according to Equation 5. Curve 72 is the term $\alpha e^{-At_a}$ of the Equation 6. Curve 74 is the term $(1-\alpha)e^{-At_a}$ of Equation 6. Curve 76 is the sum of curve 72 and curve 74 which is seen to be a close approximation to correction curve 70.

Those familiar with the art will recognize that the two terms $\alpha e^{-At_a}$ and $(1-\alpha)e^{-Bt_a}$ of Equation 6 are of the general type describing the transient behavior of active electrical circuits which contain resistance in combination with either inductance or capacitance. The method of utilizing this fact as described hereinafter is only one of several possible methods and has been selected as representative. The circuit hereinafter described also facilitates the application of a correction for varying velocities of the earth.

In preparing curve 70 as shown in FIG. 4, a constant velocity was assumed. However, in reality the velocity through the earth changes with depth from formation to formation. In Equation 6, the factor $t_s$ is equal to the distance A–C of FIG. 3 divided by the average velocity to a given depth, or stated differently $t_s$ is equal to $z/v$. the term $z$ represents the distance A–C of FIG. 3, and the term $v$ represents the average velocity through the earth from A to B in FIG. 3. As will be seen in the explanation of the circuit of FIG. 5, curve 76 of FIG. 4 can be modified to account for the varying velocities at different depths in the earth.

Reference is now made particularly to FIG. 5 which illustrates a circuit for generating a voltage correction curve represented by curve 76 of FIG. 4. FIG. 5 also illustrates means for modifying curve 76 to account for varying velocities of the earth and a means of applying the static correction.

The velocity correction circuit 77 is shown in dotted lines in FIG. 5 and will be discussed hereinafter. The remaining portion of the circuit in FIG. 5, except static correction potentiometer 96, is of a character to generate correction curve 76 of FIG. 4 and will be explained at this time. It will be noted that there are two series RC circuits. One RC circuit includes capacitor 92 and resistor 84. The other RC circuit includes capacitor 94 and resistor 86. In these two circuits, multiple pole switch 100 is provided such that in one position it provides separate shunts around capacitor 92 and capacitor 94, and in a second position the shunts are open. The circuit between capacitor 92 and resistor 84 is connected to an adder circuit 98. Likewise, the circuit between capacitor 94 and resistor 86 is connected to adder 98.

Numeral 82 represents a potentiometer on which in operation a voltage proportional to A–C of FIG. 3 is set. A suitable potentiometer 82 may be a linear potentiometer. Potentiometers 84 and 86 are similar to potentiometer 82. The contact arms of potentiometers 82, 84 and 86 are mechanically connected. This is necessary since the time constants "$At_a$" and "$Bt_a$" of Equation 6 are in reality also a function of the distance A–C of FIG. 3. The circuit is designed such that the time constant of resistor 84 and capacitor 92 is equal to "$At_a$" of Equation 6 and likewise the time constant of capacitor 94 and resistor 86 is "$Bt_a$" of Equation 6.

Potentiometer 82 is set proportional to the distance A–C of FIG. 3. Potentiometer 88 is electrically connected between the contact arm of potentiometer 82 and the electrical ground. The contact arm of potentiometer 88 is connected to one side of capacitor 92. Potentiometer 88 is set proportional to the constant $\alpha$ of Equation 6. Potentiometer 90 is also connected in the circuit between the contact arm of potentiometer 82 and electrical ground. The contact arm of potentiometer 90 is connected to capacitor 94. Potentiometer 90 is set proportional to the contsant $(1-\alpha)$ of Equation 6.

Equation 7 can be written as follows:

(7) $$x = t_s \alpha e^{-At_a} + t_s(1-\alpha)e^{-Bt_a}$$

The expression $t_s \alpha e^{-At_a}$ is obtained by the combination of potentiometer 82 and potentiometer 88 with the RC circuit of capacitor 92 and potentiometer 84. The expression $t_s(1-\alpha)e^{-Bt_a}$ is obtained by the combination of potentiometer 82 and potentiometer 90 in relation with the RC circuit of capacitor 94 and potentiometer 86.

The voltage drop across potentiometer 84 after the shunt of capacitor 92 is open is representative of the expression $t_s \alpha e^{-At_a}$ and at the same time the shunt across capacitor 94 is open. The voltage across potentiometer 86 is then representative of the term $t_s(1-\alpha)e^{-Bt_a}$. These two potential differences or voltages across potentiometer 84 and 86 are added by adder 98. This results in a voltage curve representative of $x$ as given in Equation 6 or 7. This voltage function, generated as described, has assumed a constant velocity and has not compensated for static correction. Means for incorporating static correction and velocity variation corrections into the generated waveform will now be described. Switch 100 is opened at the instant of time when $t_a = t_s$.

The static correction may be added by use of potentiometer 96 which is electrically connected to the adder circuit 98. Potentiometer 96 is set to give a voltage output corresponding to the seismic detector elevation relative to a common datum plane.

The velocity of nearly all subsurface formations vary from depth to depth. Therefore, it is usually desirable to incorporate velocity correction into the seismic signals being recorded. This is accomplished in FIG. 5 by the velocity correcting circuit 77. The velocity correction circuit 77 includes a group of individual potentiometers 78A through 78N. Each potentiometer 78A to 78N is set to have a voltage output which is proportional to the average velocity to the depth for which the potentiometer represents. The output of the various potentiometers 78A to 78N are connected sequentially at points 18A to 18N along potentiometer strip 18. In a preferred embodiment, potentiometer 18 is a circular potentiometer and has its armature connected to the shaft 22 of FIG. 1. Contact points 18A to 18N of potentiometer 18 are spaced to time points (representative of depth) at which the average velocity from the earth to that point is known. The individual potentiometer 78A then, for example, is set to have a voltage output representative of the average velocity to the depth (or time) represented by contact 18A. The rotor of potentiometer 18 rotates with the magnetic recording medium on drum 10. In other words, contact arm 79 of potentiometer 18 rotates past points 18A to 18N in synchronism with the reproduction of the seismic signals at corresponding depths or times by recording head 28. It will be noted that the voltage between points 18A and 18B, for example, varies linearly from the voltage at 18A to the voltage at 18B. This approximates the velocity correction curve, the degree of approximation depending only on the spacing of the points from 18A to 18N. The output velocity correction voltage from arm 79 is fed to each of the correction function generators and in particular to potentiometer 82 of each such generator circuit. It is thus seen that the resulting voltage waveform from adder 98 very nearly approximates a desired correction voltage which includes correction for static corrections and dynamic or variable corrections including the velocity variance from formation to formation.

The major components of FIG. 1 have been described. However, in order to more fully explain their relationship and the operation of this apparatus, attention is now directed especially to FIG. 2 which illustrates waveforms at different portions of the circuit. The waveforms shown are illustrative. The abscissa of the graph is representative of time and the coordinate is representative of voltage amplitude. The basic timing unit is sweep generator 34 which has a signal illustrated by curve A. It will be noted that the various waveforms in FIG. 2 have been designated A, B, etc., and the point on the circuit illustrated in FIG. 1 in which they occur is likewise designated by the same letters. It is seen that curve A is essentially a sawtooth waveform with a narrow or small retrace interval. The retrace interval represents the time required for the beam of the cathode ray tube to be returned to its starting position and to reset the sweep generator for generating the next linear sweep. The output of generator 34, represented by waveform A, is used to drive the horizontal plates 40 of cathode ray tube 24. The output of sweep generator 34 is also fed to differentiator circuit 38 which has an output which is represented by curve B. This is a sharp pulse coinciding with the beginning of the retrace of the waveform A. The output of differentiator circuit 38 is fed to pulse delay circuit 40 where it is delayed a time equal to the retrace interval time illustrated in curve A. The output, waveform C, from pulse delay circuit 40 is fed to pulse generator 42. The output of pulse generator 42 is illustrated in curve D. The sharp positive spike in curve C initiates the leading edge of the square pulse in curve D. The duration in time of these pulses of waveform B is dependent upon the duration of the sawtooth in waveform A, the number of seismic signals being reproduced, and the frequency of interest in the seismic signal. In general, it can be said that it is desired to sample each waveform at least four times per cycle. The normal frequency of interest in a seismic observation processing is from about 20 to about 200 cycles per second. It has been found that the sawtooth waveform A should have a frequency of about 2,000 cycles per second to insure representative sampling of each of the seismic signals and to allow operational modifications.

The output of pulse generator 42 is fed to a differentiating circuit 44 which generates a sharp pulse for each trailing edge of the waveform D. This is illustrated in curve E. The output of differentiating circuit 44 is fed to pulse generator 42B which generates a square wave similar to waveform D except that the leading edge of the square wave in curve F is coincident in time with the trailing edge of the square wave in curve D. The output of pulse generator 42B is fed to differentiator circuit 52 which generates a waveform G which is a series of sharp pulses for each trailing edge of the square pulses in the waveform F. The output of differentiator circuit 52 is fed to pulse generator 42N which generates a series of square wave pulses similar to waveform F except that the leading edge of each pulse of waveform H is coincident in time with the trailing edge of the square waves of waveform F. The outputs of pulse generator 42 to 42N, waveforms D, F and H, are fed respectively to gates 46 to 46N respectively and also to gates 48 to 48N respectively. It is obvious that by a suitable switching arrangement, it would be possible to bypass any pulse generator should it be desirable to omit the seismic signal which would normally be sampled by pulses from that generator.

Seismic signal waveforms I, J and K are reproduced by a multi-head reproducing unit 28 from the magnetic recording mechanism and are fed to amplifier and filter units 32A to 32N, respectively. When gate 46 receives a pulse from pulse generator 42, the gate is opened and an essentially square pulse is passed therethrough whose amplitude is proportional to the amplitude of the seismic signal I at that point in time. Waveform L represents the square pulses which are passed through gate 46. It is seen that a dotted curve that passes through the peaks of the pulses of waveform L approximates the seismic signal I. Likewise, waveform M represents the signal passed through gate 46B and waveform N represents the square waves which are passed through generator 46N. The outputs from gates 46 to 46N are passed through a common conductor to video amplifier 50. The waveform O represents the addition of waves that forms L, M and N and is fed to video amplifier 50. The output of video amplifier 50 is fed to print control 54 which controls the intensity of the beam of light on the face of the cathode ray tube 24.

Each seismic trace has its own electronic corrector 60A to 60N, respectively. The operation of the electronic generator and its nature was described in detail heretofore in regard to FIGS. 4 and 5 in particular. Typical correction functions are illustrated in curve P, Q and R as being generated in electronic corrector 60A to 60N, respectively. When gate 48, for example, receives a pulse from pulse generator 42 it passes a square wave therethrough whose amplitude is proportional to the amplitude of the correction curve P. Likewise, gates 48B and 48N pass therethrough the correction sampled from waveform Q and R. The resultant correction is illustrated in curve S which is fed to amplifier 64 and thence to the vertical plate 66 of cathode ray tube 24. These corrections move the beam of light vertically on the face of the cathode ray tube 24 to compensate for the seismic corrections generated by the electronic corrector generators 60A to 60N which corrects for both static and dynamic seismic corrections including velocity corrections.

As can be seen, the operation of these devices is synchronized. When motor 20 is started, seismic section recording drum 14, playback drum 10 and potentiometer 18 are all started and rotate in synchronization. When playback drum 10 crosses a zero marking point, switch 62 is closed thus starting electronic corrector circuits 60A to 60N. The opening of switch 100 which is coupled to switch 62 is delayed by any well known means until $t_s$ is equal to $t_a$. This time of opening of switch 100 is shown at 101 in FIG. 4. At the same time switch 63 is closed and energizes print control 54 if switch 61 is closed. It is not necessary to synchronize sweep generator 34 with switch 62. In the practice of this invention, before the motor 20 is started a suitable photographic film 16 is placed upon seismic section recording drum 14 and the magnetic recording medium containing the seismic section to be reproduced is placed upon playback drum 10. Potentiometer means 78A to 78N represented in FIG. 1 as being in box 75 are adjusted for the average velocities to the times or depths corresponding to each potentiometer means 78A to 78N. The potentiometer 96 is adjusted in each electronic circuit to adjust for the static correction of each trace being reproduced and in each electronic circuit 60A to 60N potentiometers 82, 84 and 86 are adjusted as described above in connection with FIG. 5. As the embodiment in FIG. 1 is started each sawtooth of sawtooth waveform A causes the spot of light to be swept linearly across the face of cathode ray tube 24. The intensity of the spot of light as it sweeps across the face of cathode ray tube 24 is modified in intensity by curve O. The spot of light on the face of cathode ray tube 24 passes through lens means 26 which focuses the light on the film 16 which is placed on revolving drum 14. The sweep of light across the face of the cathode ray tube 24 is so fast in comparison to the rotation of drum 24 that the part of film 16 which is exposed is essentially horizontal or parallel to the axis of the drum 14, and each sweep is recorded so near the preceding sweep that the individual sweeps are indistinguishable and appear as gradations of gray. The vertical position of the spot of light on cathode ray tube 24 is modified in accordance with the waveform S. It is thus seen that a variable density seismic section represented in FIG. 6 is reproduced on film 16 from magnetic recording section 12 in which the reproduced trace has seismic corrections incorporated therein.

It is to be understood that any number of seismic traces can be reproduced in the manner illustrated herein and that the general mode of operations and principles will not vary therefrom. Other modifications of the particular embodiment illustrated may also be modified within the spirit and scope of the invention. Therefore, it is desired that only such limitations be imposed on the appended claims as are stated therein.

What is claimed is:

1. A method of recording in variable density form a seismic section having a plurality of seismic signals using a cathode ray tube and a photographic recording medium which comprises: repeatedly sweeping an electron beam linearly across the face of said cathode ray tube; simultaneously reproducing an electrical signal from each seismic signal; sampling each electrical signal representative of said seismic section sequentially during each sweep thus obtaining a multiplexed signal, the time of sampling of each signal to move linearly forward with each sweep of the electron beam across the face of the cathode ray tube; varying the intensity of the electron beam and thus the light output from said cathode ray tube during each sweep in accordance with the resulting sampled multiplex signal; and exposing said photographic recording medium by moving it in a direction perpendicular to the sweep of said beam across the face of the cathode ray tube.

2. A method as defined in claim 1 including moving the electron beam vertically on the face of the cathode ray tube to incorporate seismic corrections into and for each signal within the seismic section, such vertical correction displacement for each signal being synchronized and occurring simultaneously with the sampling of the seismic signal to which such correction is to be applied.

3. An apparatus for producing a variable density corrected seismic section from a reproducible seismic section having individual seismic traces which comprises in combination: means to reproduce independent seismic signals of said reproducible seismic section; a sawtooth waveform generator; a cathode ray tube having vertical and horizontal deflection means; means electrically connecting the said horizontal deflecting means with said sawtooth generator; a first differentiator circuit electrically connected to the output of said sawtooth generator and of a character to generate a sharp pulse for each peak of said sawtooth generator output; a pulse delay circuit electrically connected to the output of said differentiator circuit; a first pulse generator electrically connected to the output of said pulse delay and of a character to generate a square pulse of short duration; a second differentiator circuit electrically connected to the output of said first pulse generator and of a character to generate a sharp spike waveform for each trailing edge of said first pulse generator; a second pulse generator electrically connected to the output of said second differentiator circuit and of a character to generate a square wave pulse of short duration whose leading edge coincides in time with the sharp spike of the output of said second differentiator circuit; a first gating means electrically connected to a first reproduced seismic signal, said gating means being also electrically connected to the output of said first pulse generator and of a character to pass said seismic signal during the receipt of a pulse from said first pulse generator; a second gating means electrically connected to a second reproduced seismic signal and to the output of said second pulse generator, said second gating means being of a character to pass a square wave pulse whose amplitude is proportional to the instantaneous value of the second seismic signal reproduced when said second gating means receives a pulse from said second pulse generator means; means electrically connecting the output of said first gating means and said second gating means to an electron beam modulating means of said cathode ray tube; an electronic correction generator for each seismic signal reproduced; a third gating means for the electronic corrector circuit for said first seismic signal; a fourth gating means for the electronic corrector for said second seismic signal; means interconnecting said first pulse generator with said third gating means; means interconnecting said second pulse generator with said fourth gating means; said third gating means being of a character to pass therethrough the voltage from said electronic corrector for said first seismic signal upon receiving a pulse from said first pulse generator and said fourth gate being of a character to pass therethrough the correction voltage from the electronic corrector for said second seismic signal upon said fourth gating means receiving a pulse from said second pulse generator; means interconnecting the output of said third gate and said fourth gate with the vertical deflecting means of said cathode ray tube.

4. A method of recording in variable density form a seismic section having a plurality of seismic signals using a cathode ray tube and a photographic recording medium which comprises: sweeping an electron beam across the face of said cathode ray tube; obtaining a multiplex signal whose amplitude varies during each sweep of said beam sequentially in accordance with the amplitude of each seismic signal of seismic section being processed at a time for each seismic signal which time moves linearly forward with each sweep varying the intensity of the electron beam during each sweep in accordance with said multiplex signal; and moving a photographic medium in a direction perpendicular to the sweep of said beam across the cathode ray tube face.

5. A method as defined in claim 4 including moving the electron beam vertically to inject seismic corrections into the seismic section, such vertical displacement for each seismic signal within the seismic section occurring simultaneous with the occurrence of the seismic signal in the multiplex signal.

6. A seismic correction function generator which comprises in combination: a first RC circuit having a first potentiometer means connected in series with a first capacitor; a second RC circuit having a second potentiometer means connected in series with a second capacitor; first switching means connected between the two terminals of the capacitor in said first RC circuit; second switching means connected between the two terminals of the capacitor in said second RC circuit; means to simultaneously open and close the said first switching means and said second switching means; and means to add the voltages of said first and said second RC circuits taken at a point between the capacitor and the potentiometer means of each RC circuit.

7. A seismic voltage function correction generator in accordance with the equation $$x = t_s \alpha e^{-At_a} + t_s(1-\alpha)e^{-Bt_a}$$

which comprises in combination: a first RC circuit having a first capacitor and a first potentiometer in series; a second RC circuit having a second capacitor and a second potentiometer in series; a first switching means connected between the terminals of said first capacitor; a second switching means connected between the terminals of said second capacitor; ganged means such that when one switching means is open the other switching means is open and when one switching means is closed the other switching means is closed to provide an electrical shunt across the said capacitors; a third potentiometer electrically connected to the side of said first capacitor opposite said first potentiometer; a fourth potentiometer means electrically connected to the side of said second capacitor opposite of said second potentiometer; a fifth potentiometer adjustable to vary the voltage to said third potentiometer and said fourth potentiometer; means for adding the voltage from between said first capacitor and said first potentiometer and the voltage from between said second capacitor and said second potentiometer; said fifth potentiometer, said second potentiometer and said first capacitor and said first potentiometer being adjustable to put into the circuit a function representative of $t_s \alpha e^{-At_a}$ and said fifth potentiometer, said fourth potentiometer, said second capacitor and said second potentiometer being adjustable to incorporate a function into the circuit representative of the expression $t_s(1-\alpha)e^{-Bt_a}$.

8. An apparatus as defined in claim 7 in which a sixth potentiometer is electrically connected to said adding means and is adjustable to provide a voltage proportional to the static correction.

9. An apparatus as defined in claim 7 in which means are provided to vary the voltage across said fifth potentiometer which includes a plurality of individual potentiometers, each potentiometer being set to have a voltage potential output proportional to the velocity for the depth on the seismic section for which the potentiometer represents.

10. A seismic correction function generator using reactive circuits whose output is a time varying function because of energy storage elements, either capacitive or inductive, which comprises in combination: a first reactive circuit to react according to the function $\alpha e^{-At_a}$; means to initiate the reaction $\alpha e^{-At_a}$; a second reactive circuit to react according to the function $(1-\alpha)e^{-Bt_a}$; second means to initiate the reaction $(1-\alpha)e^{-Bt_a}$; means to simultaneously initiate said first initiating means and said second initiating means; and a means to add the function $\alpha e^{-At_a}$ and $(1-\alpha)e^{-Bt_a}$ obtained from said first reactive circuit and said reactive circuit.

11. A seismic correction function generator which comprises in combination:
   a first reactive circuit comprising a first storage element and a first resistive element, which circuit exhibits a transient behavior according to the function $\alpha e^{-At_a}$;
   first initiating means to initiate the transient behavior in said first reactive circuit;
   a second reactive circuit including a second storage element and a second resistive element, which circuit exhibits a transient behavior according to the function $(1-\alpha)e^{-Bt_a}$;
   second initiating means to initiate the transient behavior of said second reactive circuit;
   means to simultaneously initiate said first initiating means and said second initiating means; and
   a means to add the function $\alpha e^{-At_a}$ and $(1-\alpha)e^{-Bt_a}$ obtained from said first reactive circuit and said second reactive circuit.

References Cited by the Examiner

UNITED STATES PATENTS

| | | | |
|---|---|---|---|
| 2,510,121 | 6/1950 | Lehmann | 179—100.3 |
| 2,537,105 | 1/1951 | Urick | 346—110 X |
| 2,710,661 | 6/1955 | Webster | 340—15 X |
| 2,800,639 | 7/1957 | Lee | 340—15 |
| 2,836,359 | 5/1958 | Mazzagatti | 340—15.5 |
| 2,858,475 | 10/1958 | Blake | 340—15 X |
| 2,922,070 | 1/1960 | Seevers | 315—9 |
| 3,025,123 | 3/1962 | Klein | 340—15.5 X |
| 3,044,042 | 7/1962 | Erath et al. | 340—15.5 |
| 3,080,010 | 3/1963 | Blizard | 340—15.5 X |
| 3,088,094 | 4/1963 | Heintz et al. | 340—15.5 |
| 3,093,810 | 6/1963 | Geyer et al. | 340—15.5 X |

OTHER REFERENCES

Sarbacher, Dictionary of Electronics and Nuclear Engineering, Prentice-Hall, 1959; page 803 relied on.

BENJAMIN A. BORCHELT, *Primary Examiner.*

EVERETT R. REYNOLDS, IRVING L. SRAGOW, CHESTER L. JUSTUS, SAMUEL FEINBERG,
*Examiners.*

V. S. CARNEY, S. M. URYNOWICZ, R. M. SKOLNIK,
*Assistant Examiners.*